(12) United States Patent
House

(10) Patent No.: US 8,301,508 B2
(45) Date of Patent: Oct. 30, 2012

(54) ON-LINE AUCTION METHOD ACROSS MULTIPLE AUCTION SITES

(76) Inventor: John J. House, Coppell, TX (US)

( * ) Notice: Subject to any disclaimer, the term of this patent is extended or adjusted under 35 U.S.C. 154(b) by 0 days.

(21) Appl. No.: 12/625,281

(22) Filed: Nov. 24, 2009

(65) Prior Publication Data

US 2011/0125603 A1      May 26, 2011

(51) Int. Cl.
*G06Q 30/00* (2012.01)
(52) U.S. Cl. .......................... 705/26.3; 705/37
(58) Field of Classification Search .............. 705/26.1, 705/26.3, 37
See application file for complete search history.

(56) References Cited

U.S. PATENT DOCUMENTS

| | | | |
|---|---|---|---|
| 7,440,908 B2 * | 10/2008 | Snapp et al. | 705/10 |
| 7,707,074 B1 * | 4/2010 | Cotton et al. | 705/27 |
| 7,739,148 B2 * | 6/2010 | Suzuki et al. | 705/26 |
| 7,769,640 B2 * | 8/2010 | Klenske | 705/26 |
| 2002/0120714 A1 * | 8/2002 | Agapiev | 709/218 |
| 2003/0233246 A1 * | 12/2003 | Snapp et al. | 705/1 |
| 2006/0122929 A1 * | 6/2006 | Schoen et al. | 705/37 |
| 2008/0021811 A1 * | 1/2008 | Brader-Araje et al. | 705/37 |
| 2009/0076926 A1 * | 3/2009 | Zinberg et al. | 705/26 |

OTHER PUBLICATIONS

Pinker et al. "Managing Online Auctions: Current Business and Research Issues", Management Science, vol. 49, No. 11, Nov. 2003, pp. 1457-1484.*

* cited by examiner

*Primary Examiner* — Bradley B Bayat
(74) *Attorney, Agent, or Firm* — David W. Carstens; Jeffrey G. Degenfelder; Carstens & Cahoon, LLP

(57) ABSTRACT

A computerized system and method for conducting electronic online auctions, which creates a perception of scarcity in the marketplace enhancing the demand for and marketability of the goods while minimizing the exposure time of the goods in the marketplace. The present invention improves the efficiency for conducting the liquidation sale of goods by directing the goods to auction venues having specific market parameters that will generate the highest bid. The present invention also provides suppliers with a dynamic market for expeditiously liquidating merchandise without undue exposure of their goods to the general market. The present invention is easily scalable on both its supply and demand end. The liquidation sale of merchandise is controlled by limiting the amount of available merchandise supplied to each auction venue. Furthermore, the metering of the auction merchandise is controlled as a function of both the product characteristic and the auction parameters.

20 Claims, 4 Drawing Sheets

ON-LINE AUCTION METHOD ACROSS MULTIPLE AUCTION SITES

BACKGROUND OF THE INVENTION

1. Technical Field of the Invention

The present invention relates generally to commerce in goods and more particularly to a computerized system and method for conducting electronic online auctions to maximize the sale of liquidation goods through auction.

2. Description of the Related Art

The Internet is increasingly being used to conduct electronic business. In recent years, Internet-based online auction sites have gained widespread popularity and acceptance. Auctions provide a popular and exciting marketplace for the buying and selling of property. In particular, auctions are often used to sell highly valued properties such as fine art, collectibles, real estate, and luxury items. Currently, bidding for millions of items of virtually limitless variety is conducted through an ever-increasing number of online auction sites. These auction sites offer consumers a convenient way to access a seemingly endless array of merchandise from around the world that can be readily searched, viewed, and purchased online. Furthermore, online auction sites give sellers a readily accessible presence or "storefront" from which to market items to a very large population of potential buyers.

As the popularity of this method of commerce continues to grow, so too have the number of sites and companies which offer online auctions. Presently, there are many different online auction sites which have begun to overlap and compete with one another in terms of listings (including the number and types of merchandise available) and customer base (the number of people viewing and bidding on available goods). A development in the online auction marketplace is that a select few online auction sites currently predominate in terms of merchandise availability and customer base. While such online auction sites have several inherent strengths (e.g., centralized marketplace, wide variety of merchandise, substantial customer base), in certain circumstances they exhibit inherent weaknesses.

For example, one sector of the online auction market which is not well suited to current centralized online auction sites involves the liquidation sale of overstocked or distressed inventory. Liquidation sales arise from a number of sources or channels of commerce. For example, from time to time, manufacturers, wholesalers, retailers and direct sellers find it necessary to liquidate relatively large quantities of homogeneous goods to clear or update inventories. Such liquidation sales offer a number of challenges for the liquidating party. The inherent laws of supply and demand tend to undermine the yield from the liquidation sale of goods in that maximizing the demand for the goods is difficult to maintain when a large quantity of homogeneous goods is suddenly put up for auction.

Moreover, while the online auction market is a proven business model, there are still a large number of businesses which are hesitant to participate in online liquidation auctions for the fear of damaging their valuable trademarks. A liquidation sale of goods with valuable brand names and trademarks has the potential to damage the overall brand name or trademark by diminishing the market value of the brand name or trademark in the minds of consumers. Oftentimes, manufacturers and retailers would rather destroy the goods rather than diminish the value of the brand name or trademark through overexposure in a liquidation auction.

From the foregoing, it can be appreciated that there is a need for an improved auction system for handling liquidation sales of goods. To this end, there is a need for an effective online auction business model that maximizes the yield by creating a perception of scarcity and demand in the marketplace while minimizing the exposure of the good to the market.

SUMMARY OF THE INVENTION

The present invention overcomes many of the disadvantages of prior art online auctions. The present invention comprises a computerized system and method for conducting electronic online auctions, which creates a perception of scarcity in the marketplace enhancing the demand for and marketability of the goods while minimizing the exposure time of the goods in the marketplace. The present invention comprises a network of auction sites under common control. The present invention improves the efficiency for conducting the liquidation sale of goods by distributing the goods to a plurality of separate and distinct auction venues having specific market parameters which correlate to characteristics of the goods. The present invention also provides suppliers with a dynamic market for expeditiously liquidating merchandise without undue exposure of their goods to the general market.

The present invention includes an auction inventory, which is supplied to the auction network from either a centralized source or a plurality of sources operating in conjunction with a centralized auction network controller. The inventory is comprised of merchandise supplied for liquidation auction by manufacturers, wholesalers, retailers and direct sellers. All items of merchandise comprising the inventory are registered with a centralized auction network controller where it is cataloged in a scheduling database. Each inventory item is defined by one or more characteristics, which define certain aspects of the inventory item. For example, inventory characteristics may include such aspects as product category, demographic profiles, price points, number of available units and maximum length of auction.

The centralized auction network controller further establishes a plurality of online auction venues. Each auction venue is established based upon one or more design parameters, which define the auction framework at each particular venue. For example, in one embodiment the venue design parameters may target certain product categories, demographic profiles, price points, minimum sales volume, audience size and length of auction.

Each auction venue is connected to one or more auction websites that display the items for auction at its respective venue. Bidders interact with the auction venue through their respective auction websites. While auction websites may be owned by third parties, the auction displayed on them is controlled by the centralized network controller through the auction venue. Each venue's respective auction websites may further comprise a unique graphical appearance (i.e., a template, theme or skin) so that each website appears to be a customized stand-alone online auction site.

The centralized auction network controller supplies inventory to each auction venue based upon an analysis and correlation of the inventory characteristics with the venue design parameters. In addition, the centralized auction network controller may also use external and historical data in its analysis regarding the correlation of the inventory characteristics with the venue design parameters.

The computerized method and system for conducting electronic online auctions of the present invention is easily scalable on both its supply and demand end. The liquidation sale of merchandise can be controlled by limiting the amount of available merchandise items supplied to each auction venue.

Furthermore, the metering of the auction merchandise can be controlled as a function of both the product characteristic, auction parameters, external and historical data. Moreover, the merchandise can be targeted to specific demographic and economic groups that will generate the highest bid. In addition, historical telemetry generated by previous sales of inventory having similar characteristics at auction venues having similar parameters may be used subsequently to predict auction selling trends and predicted yields.

BRIEF DESCRIPTION OF THE DRAWINGS

A more complete understanding of the method and apparatus of the present invention may be had by reference to the following detailed description when taken in conjunction with the accompanying drawings, wherein.

Figure 1:
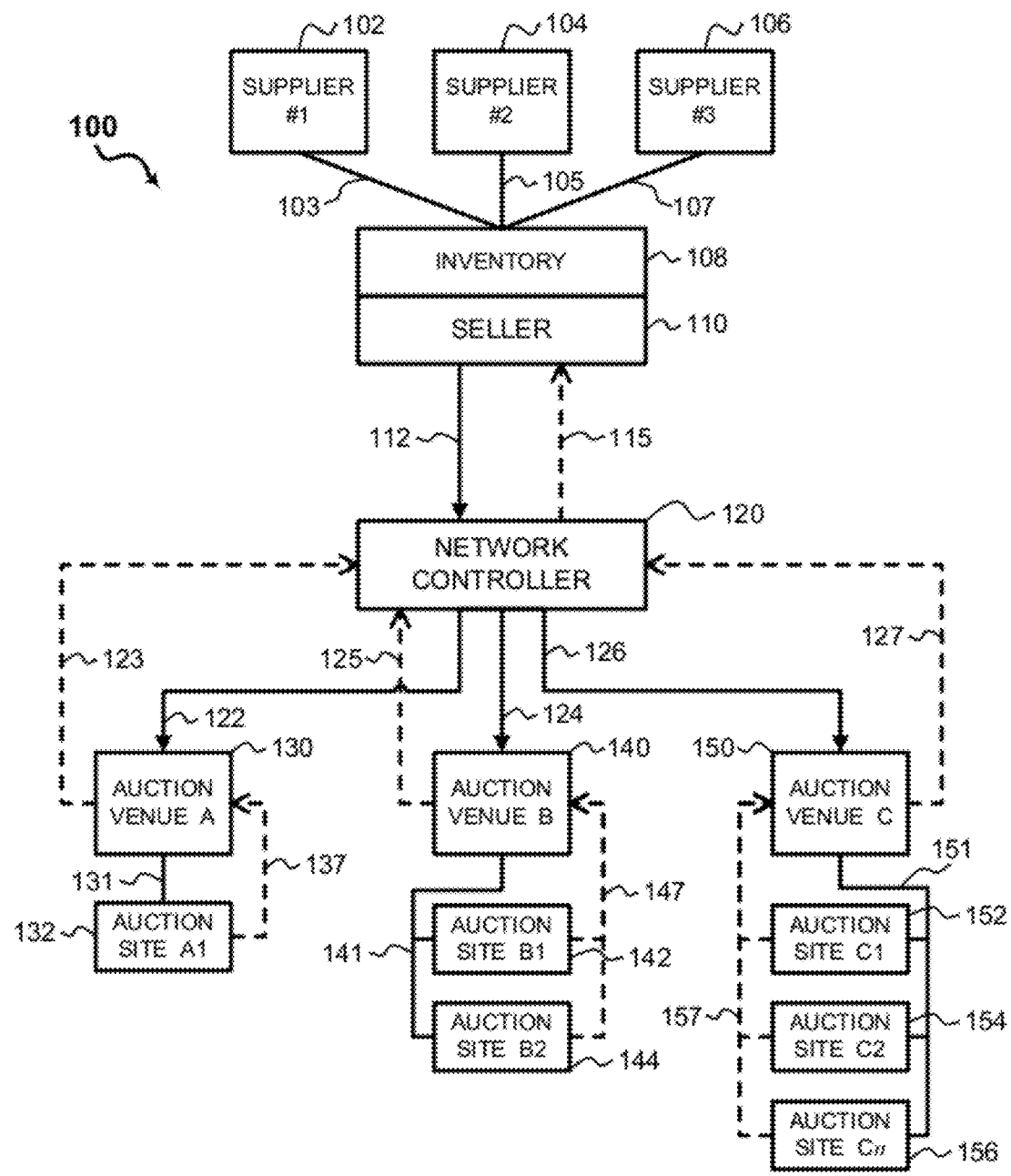
FIG. 1 is a schematic overview of a first embodiment of the computerized system and method for conducting electronic online auctions of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
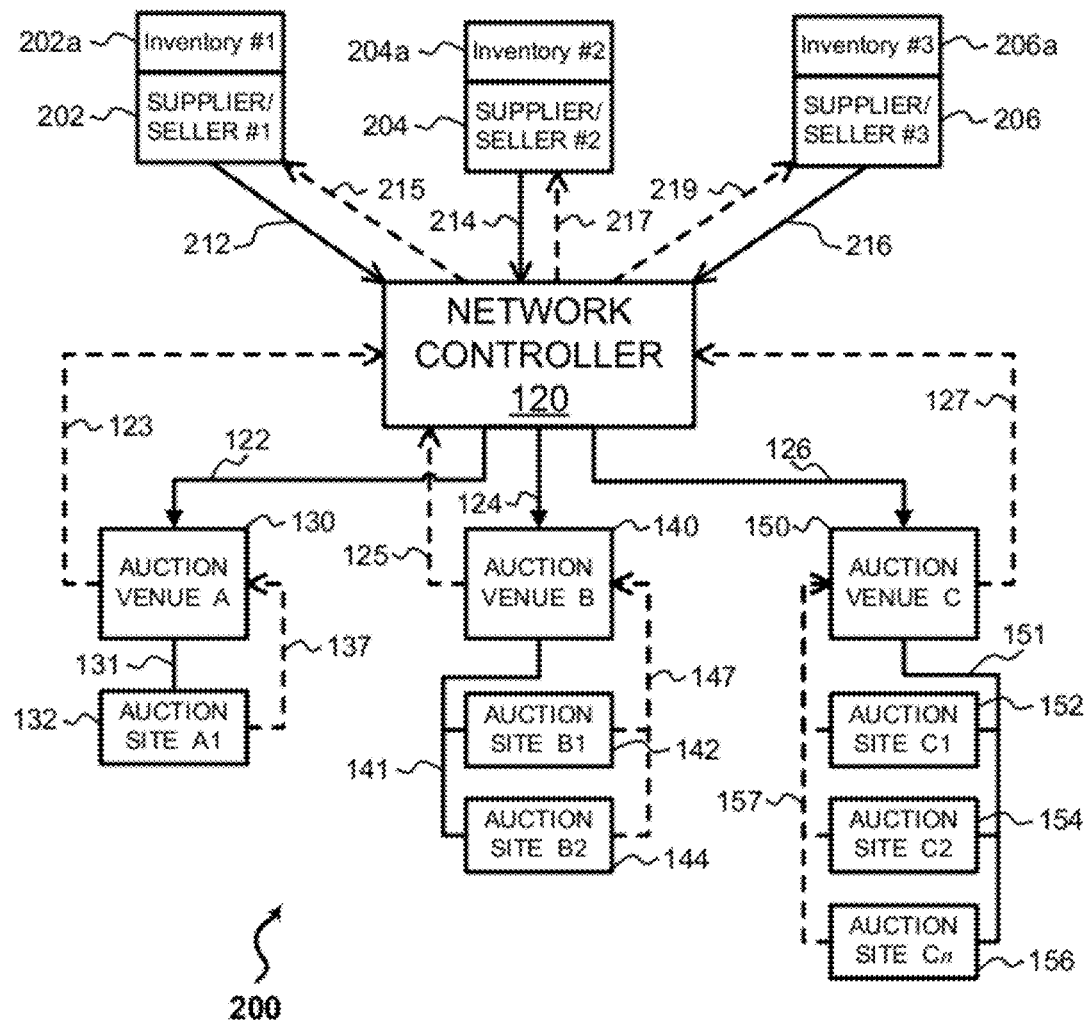
FIG. 2 is a schematic overview of a second embodiment of the computerized system and method for conducting electronic online auctions of the present invention.

With reference to FIGS. 1 and 2, embodiments of the improved computerized system and method for conducting electronic online auctions of the present invention are depicted. The focal point of both embodiments resides in the auction network controller 120, which controls the flow of information and communication between the seller(s) and the various auction venues and their respective auction sites. Information is conveyed between the network controller 120 and the seller(s) via a communications medium such as a network service provider accessed by the participants through, for example, dial-up telephone connections using modems, or direct network connections. In a preferred embodiment of the present invention, the network of auction sites is established through an online system over the Internet. A computer software application is used to manage the overall system. The software application has two components: a supplier/seller (i.e., Supply) component and a user/bidder (i.e., Demand) component. Only the auction network controller 120 is able to interact directly with both components.

In the first embodiment 100 depicted in FIG. 1, a single seller 110 is tasked with assembling a single inventory of goods and services from a plurality of suppliers. It is understood that each supplier may supply either a single item or multiple items of differing characteristics. For example, one supplier 102 may supply a variety of electronic goods to the inventory 108. Another supplier 104 may supply large quantities of a single item (e.g., a designer purse) to the inventory 108. A further supplier 106 may supply a wide variety of distinctive goods (e.g., watches, jewelry, writing implements, etc.) in varying quantities. It is understood that each supplier may have a separate and unique supply contract with the seller 110 regarding the merchandise supplied to the inventory. Alternatively, a general supply contract (e.g., based on a percentage of auction sale or yield) may apply to all or a portion of the suppliers. Ultimately, a large and diverse inventory of goods and services 108 is assembled by the seller 110 to supply a wide variety of goods and services to the various auction venues and respective auction sites. Only the seller 110 communicates with the auction network controller 120 regarding the status of the inventory.

In the second embodiment 200 depicted in FIG. 2, a plurality of supplier/sellers (e.g., 202, 204, 206) are tasked with assembling and maintaining separate inventories (e.g., 202a, 204a, 206a) of goods and services available for auction. It is understood that each supplier/seller may assemble its separate inventory from one or more providers of goods and service under separate contractual arrangements. It is further understood that each supplier/seller may supply either a single item of merchandise or multiple items of merchandise having the same or differing characteristics. For example, one supplier/seller 202 may maintain a variety of electronic goods in its inventory 202a. Another supplier/seller 204 may maintain large quantities of a single item (e.g., a designer purse) in its inventory 204a. A further supplier/seller 205 may maintain in its inventory 205a a wide variety of distinctive goods (e.g., watches, jewelry, writing implements, etc.) in varying quantities.

It is understood that each supplier/seller may have a separate and unique contractual arrangement regarding the merchandise supplied to its respective inventory. Alternatively, the supplier/seller may procure its respective inventory in accordance with a general supply contract (e.g., based on a percentage of auction sale or yield) with each of its associated suppliers. Thus, in contrast with the first embodiment 100, which features a centralized inventory provided by a single seller 110, the inventory of the second embodiment 200 of the present invention is distributed amongst several supplier/sellers (e.g., 202, 204, 206).

Moreover, the centralized auction network controller 120 maintains discrete lines of communication between itself and each supplier/seller 202, 204, 206. For example, a first supplier/seller 202 transmits 212 and receives 215 information, instructions and data with the auction network controller 120 via a communication link that is distinct from the communication link that permits a second supplier/seller 204 to transmit 214 and receive 217 information, instructions and data with the network controller 120. Likewise, a third supplier/seller 206 transmits 216 and receives 219 information, instructions and data with the network controller 120 via a communication link that is distinct from the communication links discussed previously with regard to the first 202 and second 204 supplier/sellers. Thus, in the second embodiment, the auction network controller 120 controls an inventory which is distributed amongst several supplier/sellers (e.g., 202, 204, 206) by communicating with each supplier/seller via a discrete line of communication. In contrast with the first embodiment 100, wherein the network controller 120 communicates exclusively with a single seller 110 regarding a centralized inventory 108, in the second embodiment 200, the network controller 120 communicates with a plurality of separate supplier/sellers (e.g., 202, 204, 206) regarding their respective inventories (e.g., 202a, 204a, 206a).

Regardless of whether the system of the present invention includes a centralized inventory 108 as shown in the first embodiment in FIG. 1, or a distributed inventory as illustrated in the second embodiment in FIG. 2, the remainder of the system and the method of the system are essentially the same. The ultimate initial goal of each system embodiment is to ensure that the auction network controller 120 has access to a large and diverse inventory of goods and services in order to supply a wide variety of auction items to the auction network's various auction venues and their associated auction sites. Additionally, in accordance with the teachings of the present invention, it is understood that the actual auction items may be physically located at a centralized location or at a plurality of remote locations. Moreover, the goods offered for auction may physically reside at the supplier's location until the auction is completed. Thus, a wide range of management flexibility may be built into the system.

Whether centralized under a single seller or distributed amongst a plurality of supplier/sellers, all merchandise comprising the inventory is registered with the centralized auction network controller 120, where it is cataloged into a scheduling database 160. Upon registration, each item is further categorized by one or more characteristics that define, describe and delineate certain aspects of the auction item in the inventory. Characteristics directed at product category, demographic profiles, price point profiles, number of available units, auction length restrictions, and minimum auction size may be used to categorize each auction item in the inventory. For example, in one embodiment the inventory data file of each auction item is stored in the scheduling database 160 and includes the following information:

| PRODUCT CATEGORY |
| --- |
| Subcategories |
| DEMOGRAPHIC INFO |
| Age |
| Gender |
| Income |
| Education Level |
| Religion |
| ITEM COST |
| RETAIL PRICE |
| MINIMUM PRICE POINT |
| BUY IT NOW PRICE POINT |
| MAXIMUM LENGTH OF AUCTION |
| # OF AVAILABLE UNITS |
| MAX UNITS PER AUCTION |
| MINIMUM PARTICIPANTS/BIDDERS |

Typically, the registration of auction merchandise is accomplished by data input from the merchandise seller to the network controller 120. Thus, in the first embodiment of the invention depicted in FIG. 1, the centralized seller 110 registers all auction items in its inventory 108 with the network controller 120; while in the second embodiment of the invention depicted in FIG. 2, each supplier/seller 202, 204, 206 registers the auction items in its respective inventory 202a, 204a, 206a with the network controller 120. Upon registration with the network controller 120, each auction item is assigned a registration mark (e.g., a number or alpha-numeric symbol) and the characteristic data is added to the scheduling database 160.

For ease of use, duplicate auction merchandise may be registered in groupings of like items. For example, if a seller has 100 identical watches it wishes to register into the inventory, they may be registered as a group with each watch having the same characteristics. In this case, each watch is assigned both an individual registration mark and a linking group identifier. In addition, the maximum number of units available to an individual auction may be limiting characteristic of the item.

In a preferred embodiment, the registration of inventory is accomplished through an online website controlled by the network controller 120, which provides standardized data input screens for simplicity and consistency. The data input screens may feature pull down menus with standardized ranges, activation buttons, and fill in the blank portions.

With reference again to FIGS. 1 and 2, the improved computerized system and method for conducting electronic online auctions of the present invention further includes a plurality of auction venues which are controlled by the centralized auction network controller 120. The auction venues are autonomous of one another, but are commonly controlled by the centralized auction network controller 120. Information is conveyed between the network controller 120 and the various auction venues via a communications medium such as a network service provider accessed by the participants through, for example, dial-up telephone connections using modems, or direct network connections. In a preferred embodiment of the present invention, the communications network between the network controller 120 and the auction venues is established through an online system over the Internet.

The centralized auction network controller 120 maintains separate lines of communication between itself and each auction venue. For example, the centralized auction network controller 120 transmits 122 information, instructions and data to a first auction venue 130 and receives 123 feedback information, instructions and data via a communication link that is distinct from the communication link that permits the second auction venue 140 to transmit 125 and receive 124 information, instructions and data with the network controller 120. Likewise, the network controller 120 transmits 126 information, instructions and data to a third auction venue 150 and receives 127 feedback information, instructions and data from the third auction venue 150 via a communication link discussed previously with regard to the first 130 and second 140 auction venues.

The centralized network controller 120 establishes the basic framework of each auction venue based upon one or more design parameters. The venue design parameters identify certain criteria, which broadly delineate the type of merchandise best suited for auction on the site. Venue design parameters may include certain product categories, demographic profiles, price points, minimum sales volume, audience size, traffic volume and length of auction. By way of example, the following chart illustrates a simplified use of venue design parameters to broadly define the basic framework of the auction venues depicted in the Figures:

| VENUE DESIGN PARAMETER | AUCTION VENUE A | AUCTION VENUE B | AUCTION VENUE C |
| --- | --- | --- | --- |
| PRODUCT CATEGORY Specific Subcategories | FOOD Beverages Candy KITCHEN Cups & Saucers | TOOLS Power tools Woodworking Hand tools Kitchen tools Garden tools | APPAREL Women Dresses Shoes Coats Evening Wear Casual Wear |

-continued

| VENUE DESIGN PARAMETER | AUCTION VENUE A | AUCTION VENUE B | AUCTION VENUE C |
|---|---|---|---|
| DEMOGRAPHIC INFO | | | |
| Age | 25-65 | 35-70 | 15-25 |
| Gender | Both M&F | Male | Female |
| Social Class | Middle | upper middle | upper middle |
| Education Level | BA | HS-PhD | $4^{th}$-$8^{th}$ grade |
| Religion | All | All | All |
| PRICE POINT | $25-$125 | $50-$200 | $300-$700 |
| SALES VOLUME (/m) | $50K | $750K | $1.0 mil |
| AUDIENCE SIZE (/m) | 10,000 | 25,000 | 120,000 |
| AUCTION LENGTH | 5 days | 2 days | 2 weeks |

A review of each venue's design parameters quickly reveals the marketing framework to which each of the venues is directed. For example, venue A is generally directed at food, venue B is generally directed at tools, and venue C is generally directed at apparel. Obviously, the more design parameters assigned to an auction venue the greater the marketing customization of the venue. Moreover, a comparison of two venue's design parameters easily demonstrates the marketing divergence between the two venues. For example, venue B is broadly directed at middle aged men who are interested in different kinds of tools, whereas venue C is generally directed at fashion conscious young girls interested in clothing and apparel.

It is further noted that while most venue design parameters are subjectively defined by the centralized network controller 120, others (e.g., sales volume, audience size, price point) may be objectively determined through an analysis of historical data of the auction venue. Indeed, many venue design parameters can be linked to an analysis of historical sales data generated by each particular auction venue. To this end, the centralized network controller 120 also maintains a historical database on each auction venue that records the economic, marketing and demographic data on each item sold at a particular venue. Analysis of this information can be used subsequently to fine tune a venue's design parameters to maximize sales volume and yield. Moreover, the information generated by one venue can be correlated to another venue to fine tune its design parameters. In addition, the analysis of historical sales data may also be used to predict the expected yield for an item of merchandise, in general, or at a venue having similar design parameters.

In a preferred embodiment, the plurality of auction venues are established through an online website controlled by the network controller 120, which provides standardized data input screens for simplicity and consistency. The data input screens may feature pull down menus with standardized ranges, activation buttons, and fill in the blank portions.

With reference again to FIGS. 1 and 2, the improved computerized system and method for conducting electronic online auctions of the present invention further includes a one or more auction websites connected to each auction venue. While auction websites may be owned by third parties, the auctions displayed on them are controlled by the centralized network controller 120 through the respective auction venue. Each auction website is connected to only one auction venue at a time. Bidders interact with the auction venue through its respective auction websites. Information is conveyed between each venue and its respective auction sites by a duplex communications medium such as a network service provider accessed by the participants through, for example, dial-up telephone connections using modems, or direct network connections. In a preferred embodiment of the present invention, the communications link between each venue and its associated auction sites is established through an online system over the Internet.

For example, as shown in the FIGS. 1 and 2, auction venue B 140 transmits 141 identical information, instructions and data to each of its respective auction sites (e.g., B1 and B2) 142, 144. Similarly, each of the auctions sites (e.g., B1 and B2) may transmit 147 feedback information (e.g., bids) to its respective auction venue B 140. Auction venue B 140, in turn, retransmits and displays bid information received from a bidder at one of the auction sites (e.g., B2) to all of its respective auction sites (e.g., B1 and B2).

Figure 3:
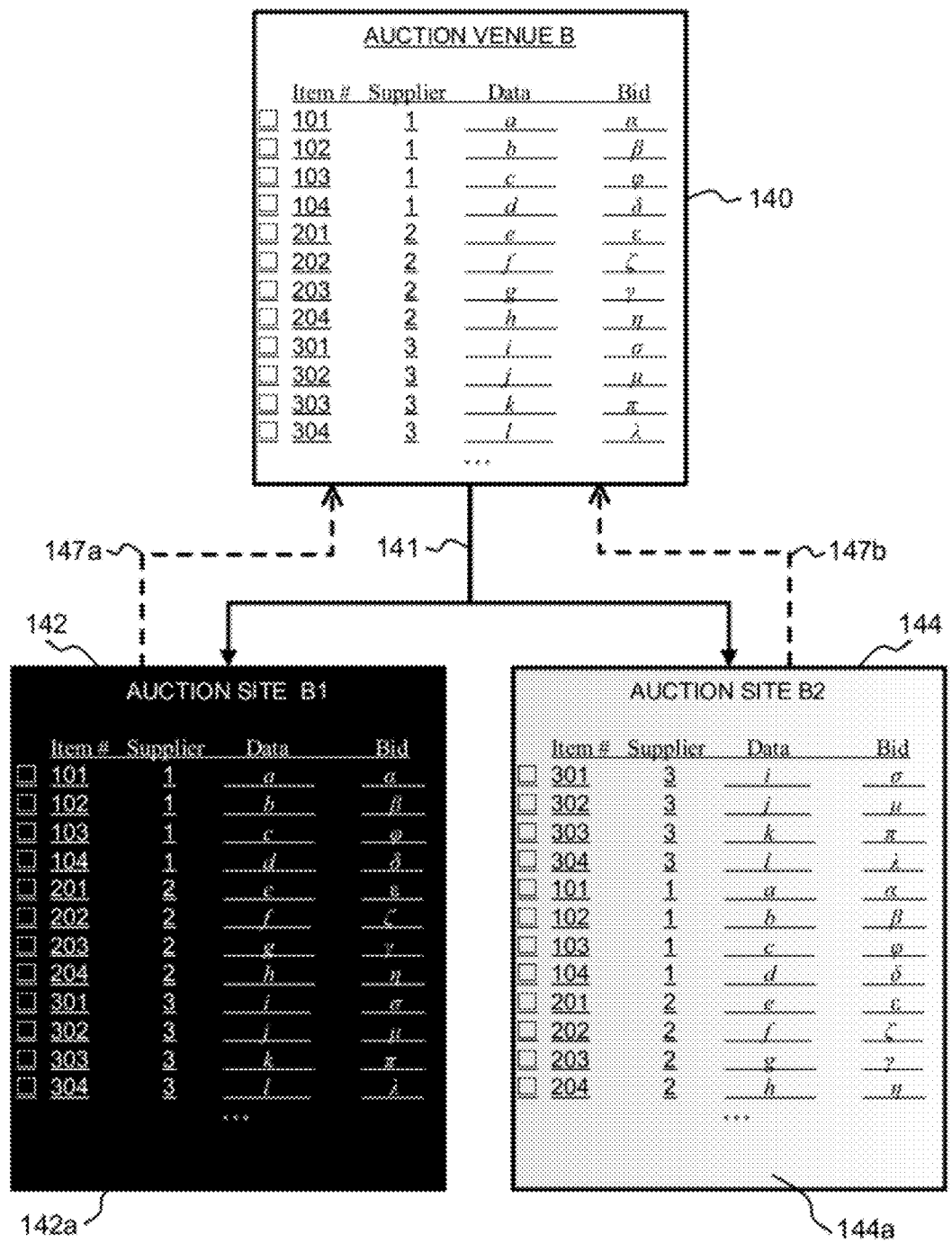
FIG. 3 illustrates the linking displays between an auction venue and its respective auction sites in an embodiment of the computerized system and method for conducting electronic online auctions of the present invention.

In addition, each auction venue's respective auction websites may further comprise a unique graphical appearance (i.e., a template, theme or skin) so that each website appears to be a customized stand-alone online auction site. For example, as shown in FIG. 3, the information at auction venue B 140 is transmitted 141 to both auction site B1 142 and auction site B2 144. Whereas auction site B1 142 includes a display 142a having a graphical appearance comprising white letters on a darkened background, auction site B2 144 includes a display 144a having a graphical appearance comprising black letters on a lightly shaded background. It is further noted that while the information displayed on each auction site is identical, the order of the information may be shuffled to further distinguish the related auction sites from one another. While depicted in the Figures in very simplistic fashion, it is understood that the graphical appearances of auction websites may be greatly enhanced and customized so that each website appears to be a customized stand-alone online auction site.

The computerized method and system for conducting electronic online auctions of the present invention is easily scalable on both its supply and demand end. Moreover, the transaction costs associated with setting up an auction site are very low. In addition, the system inherently provides a great deal of operational flexibility that is highly responsive to changing market conditions. The system is flexible on both is supply side and its demand side. While depicted in the Figures in a simplistic form, it is understood that all major components (i.e., seller, suppliers, venues and auction sites) may be easily replicated, yet customized so as to create a fully integrated network of auctions. However, regardless of how large a network is constructed, control of the auction network of the present invention is concentrated in the centralized auction network controller 120. Such concentration and centralization of control enables the system of the present invention to manage and distribute the inventory much more efficiently.

Figure 4:
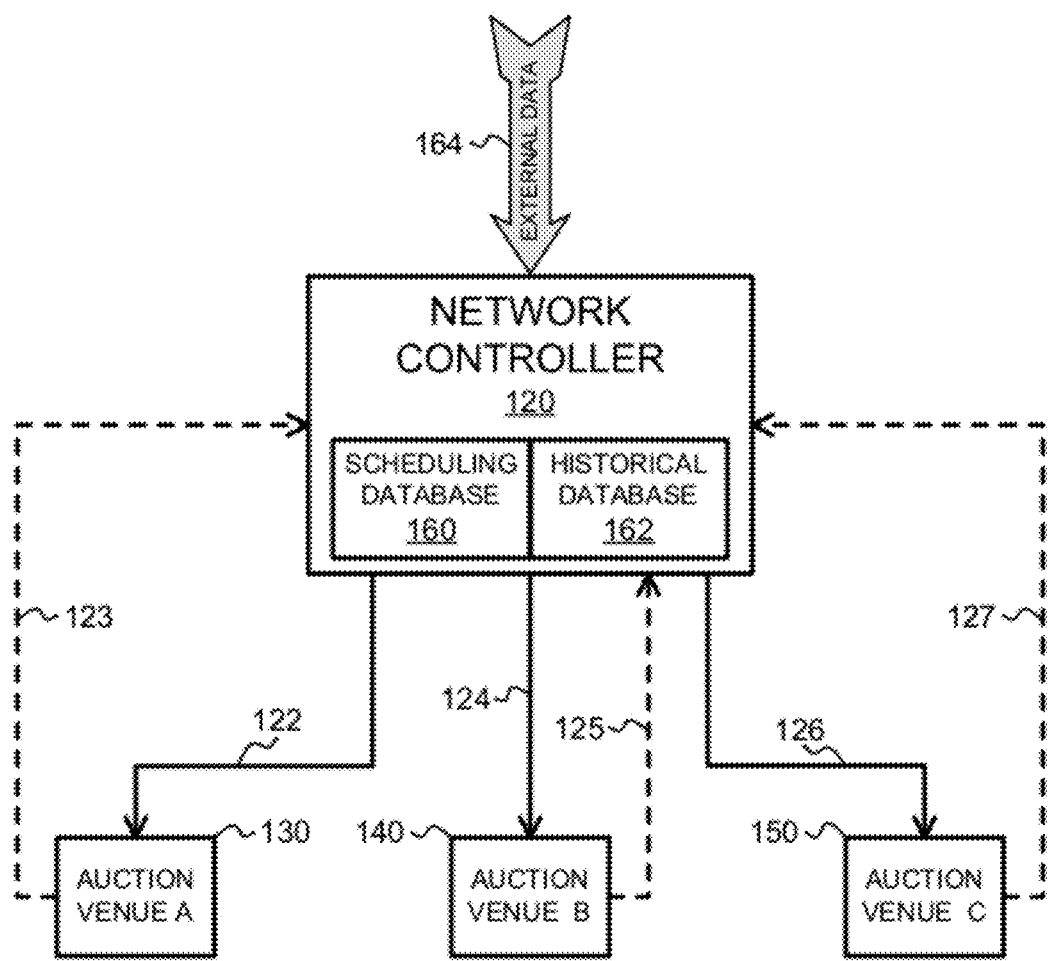
FIG. 4 is a schematic overview illustrating the analysis and correlation processes performed by the auction network controller and the auction venues in an embodiment of the computerized system and method for conducting electronic online auctions of the present invention.

With reference to the Figures and in particular FIG. 4, and in accordance with the method of the present invention, an auction item from a seller's inventory is registered with the network controller 120. The network controller 120 generates an inventory data file on the auction item that includes a registration mark (e.g., a number or alpha-numeric symbol) and at least one characteristic defining the item. The inventory data file is stored in the scheduling database 160. Once an auction item has been registered with the network controller 120 and its characteristics catalogued in an inventory data file in the scheduling database 160, the network controller 120 performs an algorithm which analyzes and correlates the inventory characteristics of the auction item with the design parameters of available auction venues to efficiently distribute the auction item's data file to an auction venue which best suits the auction item so as to maximize its yield in the shortest possible time.

In addition, the network controller 120 can assemble sets or lots of inventory data files for distribution to the various auction venues. Thus, each auction item is evaluated not only in terms of its compatibility and correlation with the parameters of the auction venue, but also in relation to its compatibility and correlation with the total mix of merchandise inventory supplied to an auction venue. Thus, the network controller 120 is able to refine and balance the mix of inventory items supplied to each auction venue to maximize sales yield and generate the highest rate of sale.

The liquidation sale of merchandise can also be managed more efficiently and effectively by controlling the amount of available merchandise supplied to each auction venue and distributing the auction merchandise as widely as possible. For example, if 100 identical watches are supplied to the inventory for liquidation auction, instead of having all 100 watches auctioned on a single auction site, the distribution algorithm may be programmed so that the watches are distributed amongst the entire auction network in order minimize the supply at any single auction. This, in turn, creates a perception of scarcity in the marketplace (i.e., a single auction site) which enhances the demand for and marketability of the goods while minimizing the exposure time of the goods in the marketplace. Thus, the present invention improves the efficiency for conducting the liquidation sale of goods by directing the goods to auction venues having specific market parameters that will generate the highest yield in the least amount of time.

The method of the present invention includes controlling the distribution of auction merchandise as a function of both product characteristic, auction venue design parameters, real time data, external data and historical data. In addition, the selection of auction merchandise for distribution to a particular venue may also be function of the total mix of merchandise supplied to a venue. Thus, each auction item is evaluated not only in terms of its compatibility and correlation with the parameters of the auction venue, but also in relation to its compatibility and correlation with the total mix of merchandise inventory supplied to an auction venue. Consequently, in accordance with the method of the present invention, sets or lots of inventory data files are selected and assembled for distribution to specific auction venues. By controlling the mix of inventory items supplied to each auction venue, supply may be refined and balanced with demand so as to maximize yields and speed of sales.

In addition, the various inventory characteristics and design parameters may be weighted or biased based upon subjective or objective analysis. For example, the merchandise can be targeted to specific demographic and economic groups that will generate the highest yield in the least amount of time. Similarly, sales data in the historical database 162 may be used to refine and adjust the algorithm. In addition, external data 164 such as weather, seasonality (i.e., time of year), day of the week, time of day, economic conditions (e.g., stock market average), current news reporting may also be used to refine and adjust the algorithm. Finally, current real time data (e.g., auction site traffic volume and velocity, percentage of new vs. returning visitor, number of registered bidders, average order size) generated by the auction venues and their associated auction sites may also be used to refine and adjust the algorithm.

Upon completion of the algorithm, the network controller 120 transmits the auction item's data file to a single venue where it is displayed on all auction sites related to the venue. Participants at one or more auction sites may submit bids on the auction item until it is sold or the auction expires. Auction bids are transmitted from each auction site to its respective auction venue where it is re-transmitted to all associated auction sites. Real time bidding information may also be transmitted from the various auction venues back to the network controller 120 where it is used to adjust the algorithm and continually update the historical database 162. Upon completion of the auction, the winning bidder is notified and informed where and how to complete the transaction. The network controller 120 serves as the information nexus between the winning bidder and the seller of the auction item.

The algorithm may also be used to predict auction selling trends and to generate expected yield calculations to prospective sellers based upon historical telemetry generated by previous sales of inventory having similar characteristics at auction venues having similar parameters may be used subsequently to predict auction selling trends, product launching points (i.e., where and when to launch product auctions and at what starting bid and bid increments) and predicted yields.

It will now be evident to those skilled in the art that there has been described herein an improved method and system for conducting electronic online auctions. Although the invention hereof has been described by way of a preferred embodiment, it will be evident that other adaptations and modifications can be employed without departing from the spirit and scope thereof. For example, some of the steps in the system procedure could be conducted manually in addition to those conducted electronically. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A computer-implemented method for conducting a multi-site auction supplied from a source of inventory, comprising the steps of:
   (a) establishing in a computerized common controller processor and memory a plurality of auction venues autonomous of one another but under the control of said computerized common controller processor and memory, wherein each of said plurality of auction venues is connected to one or more affiliated auction websites, which each permit a unique set of participants to access auctions generated by its respective auction venue;
   (b) establishing in said computerized common controller memory a unique set of parameters for each auction venue, wherein each set of parameters delineates a distinct marketing framework for each auction venue;
   (c) establishing an inventory comprising a plurality of items;
   (d) generating a data file in said computerized common controller memory for each of said plurality of items in said inventory, each said data file including a registration mark and at least one characteristic of said item;
   (e) distributing each data file to a single auction venue amongst said plurality of auction venues based upon an algorithm performed by said computerized common controller processor and memory, wherein said algorithm correlates said item characteristics in each said data file with said unique set of parameters for each said auction venue; and
   (f) conducting a separate auction at each of said auction venues from said one or more auction websites affiliated with each said auction venue, wherein each auction is displayed on each of said respective one or more affiliated auction websites and controlled by the centralized network controller processor and memory through each respective auction venue, and wherein each auction venue receives feedback information from its respective affiliated auction websites and retransmits said feedback information to all respective affiliated auction websites.

2. The method of claim 1, wherein said inventory is established by a single seller.

3. The method of claim 1, wherein said inventory is established by a plurality of sellers.

4. The method of claim 1, wherein each of said auction websites has a unique graphical appearance.

5. The method of claim 1, wherein said algorithm further comprises analyzing historical sales data and external data.

6. The method of claim 5, wherein said historical sales data is generated by said plurality of venues.

7. The method of claim 5, wherein said algorithm further comprises analyzing real time sales data generated by said plurality of venues.

8. A computer-implemented method for conducting a multi-site auction supplied from a source of inventory, comprising the steps of:
(a) establishing in a computerized common controller processor and memory a plurality of auction venues autonomous of one another but under the control of said computerized common controller processor and memory, wherein each of said plurality of auction venues is connected to one or more affiliated auction websites, which each permit a unique set of participants to access auctions generated by its respective auction venue;
(b) establishing in said computerized common controller memory a unique set of parameters for each auction venue, wherein each set of parameters delineates a distinct marketing framework for each auction venue;
(c) establishing an inventory comprising a plurality of items;
(d) generating a data file in said computerized common controller memory for each of said plurality of items in said inventory, each said data file including a registration mark and at least one characteristic of said item;
(e) selecting a first set of data files from said inventory;
(f) distributing each data file in said first set of data files to a single auction venue amongst said plurality of auction venues based upon an algorithm performed by said computerized common controller processor, wherein said algorithm correlates said item characteristics in each of said data files with said unique set of parameters for each auction venue;
(f) conducting a separate auction at each of said auction venues from said one or more auction websites affiliated with each said auction venue, wherein each auction is displayed on each of said respective one or more affiliated auction websites and controlled by the centralized network controller processor and memory through each respective auction venue, and wherein each auction venue receives feedback information from its respective affiliated auction websites and retransmits said feedback information to all respective affiliated auction websites.

9. The method of claim 8, wherein said algorithm limits the distribution of data files having identical characteristics to the same auction venue.

10. The method of claim 8, wherein said algorithm further comprises analyzing historical sales data and external data.

11. The method of claim 9, further comprising:
(h) selecting a second set of data files from said inventory;
(i) distributing each data file in said second set of data files to a single auction venue amongst said plurality of auction venues based upon said algorithm performed by said computerized common controller processor, wherein said algorithm correlates said item characteristics in each of said data files with said unique set of parameters for each auction venues;
(f) conducting a second separate auction at each of said auction venues from one or more auction websites affiliated with each said auction venue, wherein each auction is displayed on each of said respective one or more affiliated auction websites and controlled by the centralized network controller processor and memory through each respective auction venue, and wherein each auction venue receives feedback information from its respective affiliated auction websites and retransmits said feedback information to all respective affiliated auction websites.

12. The method of claim 11, wherein said step of selecting a second set of data files, comprises an analysis by said computerized common controller processor and memory of sales data from auction of said first set of data files.

13. A computerized system for supplying a multi-site auction, comprising:
(a) an inventory that includes a plurality of items offered by a seller;
(b) a computerized network controller processor and memory in communication with said seller; said network controller processor and memory having a catalog database comprising a computerized data file on each of said plurality of items, each said data file including a registration mark and at least one characteristic of said item;
(c) a plurality of auction venues autonomous of one another but in communication with and under the control of said computerized network controller processor and memory, wherein each of said auction venues has a unique set of operating parameters which are controlled by said computerized network controller processor, wherein each set of operating parameters delineates a distinct marketing framework for each auction venue; and
(d) a plurality of auction websites, wherein each of said auction websites is affiliated and in communication with only one of said plurality of auction venues, each of said plurality of auction websites having a display which is linked to and controlled by said computerized network controller processor through its respective auction venue and which permits a unique set of participants to access auctions generated by its respective auction venue;
wherein said computerized network controller processor and memory selects and distributes each data file to one of said plurality of auction venues based upon an algorithm performed by said computerized network controller processor and memory, which correlates said item characteristics in each said data file with said unique set of parameters of each said auction venue.

14. The system of claim 13, wherein said seller comprises a plurality of sellers, each of said sellers having a discrete line of communication with said computerized network controller processor and memory.

15. The system of claim 13, wherein each of said auction websites has a unique graphical appearance.

16. The system of claim 13, wherein said computerized network controller processor and memory further comprises a historical sales database and an input for external data, and wherein said algorithm further comprises analyzing historical sales data and external data.

17. The system of claim 16, wherein said historical sales database generates its data from sales data generated by said plurality of venues.

18. The system of claim 17, wherein said computerized network controller processor and memory further comprises an input for real time sales data generated by said plurality of venues and wherein said algorithm further comprises analyzing real time sales data.

19. The system of claim 13, wherein said computerized network controller processor and memory selects a first set of data files from said inventory and distributes each of said first set of data files to a single auction venue amongst said plurality of auction venues based upon said algorithm.

20. The method of claim 19, wherein said computerized network controller processor and memory selects a second set of data files from said inventory and distributes each of said second set of data files to a single auction venue amongst said plurality of auction venues based upon said algorithm, which further comprises correlating said item characteristics in said second set of data files with said venue parameters, historical sales data, real time data and external data.

* * * * *